Patented Mar. 2, 1937

2,072,738

UNITED STATES PATENT OFFICE 2,072,738

PROCESS OF STABILIZING CELLULOSE XANTHATE

Harry B. Dykstra, Wilmington, Del., assignor to E. I. du Pont de Nemours & Company, Wilmington, Del., a corporation of Delaware No Drawing. Application July 6, 1933, Serial No. 679,218. Renewed July 3, 1936

5 Claims. (Cl. 260—100)

This invention relates to a process for stabilizing xanthates of polymeric carbohydrates, and more particularly to a process for stabilizing cellulose xanthate.

Cellulose xanthate is prepared by the reaction of carbon disulfide with alkali cellulose. Although the product obtained in this way actually contains cellulose sulfothiocarbonate together with sodium hydroxide and various sulfur containing impurities, the mixture is usually spoken of simply as cellulose xanthate. This mixture is referred to hereafter as cellulose xanthate or "crude cellulose xanthate" whereas the term "pure cellulose xanthate" is used when cellulose sulfothiocarbonate itself is meant.

When freshly prepared, cellulose xanthate is soluble in water or dilute sodium hydroxide forming solutions known as viscose. Cellulose xanthate slowly undergoes decomposition on aging and becomes insoluble. Viscose undergoes the same change. This transformation to the insoluble form which generally occurs in six to twelve days at 25° C. has been attributed to hydrolysis of the cellulose sulfothiocarbonate with loss of the solubilizing sulfothiocarbonate groups and the regeneration of cellulose. Increase in temperature greatly accelerates the change to the insoluble form. The decomposition of the xanthate is represented by Heuser in his "Textbook of Cellulose Chemistry" by the following equations:

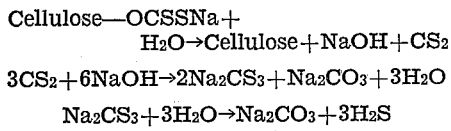

$$3CS_2 + 6NaOH \rightarrow 2Na_2CS_3 + Na_2CO_3 + 3H_2O$$

$$Na_2CS_3 + 3H_2O \rightarrow Na_2CO_3 + 3H_2S$$

Attempts have been made to stabilize solutions of cellulose xanthate (viscose) by the addition of chemical reagents but the improvement in stability is small.

All of the methods for stabilizing cellulose xanthate described by earlier investigators are subject to certain disadvantages. The methods involving precipitation or extraction are tedious, remove a portion of the alkali, and in addition are costly. The removal of the alkali makes it more difficult to prepare satisfactory solutions of the product. The methods involving vacuum distillation have the drawback of requiring a long time to effect dehydration, for example, fifty hours for the complete removal of water by vacuum distillation at 20 to 30° C. Because of the poor heat transfer in a vacuum, dehydration by this method even at higher temperatures, for example 70–80° C., is relatively slow.

This invention has, as an object, to increase the stability of xanthates of polymeric carbohydrates and, particularly, cellulose xanthate. A further object is to increase the stability of cellulose xanthate without materially altering the total alkali:cellulose ratio of the crude xanthate. A still further object is the production of cellulose xanthate which retains its solubility in dilute sodium hydroxide solution for at least one month when aged in the dry state at 25° C.

These objects are accomplished by treating carbohydrate xanthates and preferably cellulose xanthate with a current of air or other inert gas, preferably at a moderately elevated temperature until dehydration is substantially complete.

It has now been found that the disadvantages connected with the earlier methods can be overcome by dehydrating the xanthate with a current of air or other suitable inert gas such as nitrogen. Moderately elevated temperatures, for example, 40 to 100° C. can be used. With a rapid stream of warm air passing over the xanthate the evaporation of the water is so rapid that the temperature of the xanthate is kept considerably lower than that of the air current until the major portion of the water has been removed. This prevents the rapid decomposition which normally takes place when the xanthate is heated, as is evidenced by experiments showing that one hour's storage of xanthate at 65° C. brings about enough decomposition to render the product insoluble, whereas one hour's treatment of xanthate with a current of relatively dry air at 65° C. removes the major portion of the water and leaves the product soluble. If the treatment with air is continued for an hour or two longer, a dry stable product is formed, the term "stable" as applied to cellulose xanthate being intended to indicate a product soluble in dilute alkali solution. The dehydration of cellulose xanthate is satisfactorily accomplished by passing a current of hot air over thin layers of freshly prepared cellulose xanthate. Cellulose xanthate which has been partially ripened may also be used.

The air used for this purpose requires no special treatment, the quantity of carbon dioxide in the air being generally insufficient to be harmful. The presence of moisture is likewise of little consequence, since increasing the temperature of air from 25° C. to 65° C. enormously increases its capacity for taking up water. After the major portion of the water has been removed from the xanthate, the latter is removed from the oven, ground finely, and then returned to the oven for further dehydration. In removing the last traces of moisture, perfectly dry air may be used although this is not essential. Since the product tends to absorb moisture on standing, it should be placed in sealed containers immediately after the drying operation or be stored in a dry chamber. Vacuum sealed containers can be used to advantage in storing the product.

In applying the above process, it has been found advantageous to employ cellulose xanthate prepared with a relatively high percentage of carbon disulfide, i. e., a product prepared from carbon disulfide and cellulose in a ratio of at least 40:100. Xanthate prepared with only sufficient carbon disulfide to give a soluble product, gave when treated by the process of the present invention, a final product of improved stability as compared with the crude material but nevertheless of less stability than that prepared using a higher carbon disulfide:cellulose ratio. The probable reason for this is that products prepared with a large amount of carbon disulfide can undergo a certain amount of decomposition, i. e., loss of sulfothiocarbonate groups, without becoming insoluble. This enables these products to take care of the small amount of decomposition occurring during the dehydration process.

The stabilized products can be dissolved in dilute alkali to form solutions which are comparable with those of fresh viscose. In preparing solutions of dehydrated products which have been aged for a few months it is generally desirable to use somewhat more alkali than is used for solutions prepared from freshly dehydrated xanthate or from untreated xanthate. For example, the use of nine per cent total alkali is recommended for solutions prepared with dehydrated products which have been aged for two or more months, whereas six per cent total alkali is sufficient when the products are relatively fresh. Cellulose regenerated from solutions of the stabilized products appears to have the same properties as that obtained from solutions of fresh xanthate.

The following examples are given to illustrate the dehydration process which forms the basis of this invention.

*Example I*

Four hundred and sixty-seven parts by weight of crude cellulose xanthate was spread out to a thickness of approximately one-half inch in shallow trays and placed in an air circulating oven (Freas thermo-electric oven) maintained at 65° C. After 1.5 hours treatment, the xanthate was ground until the particles passed through a 10-mesh screen. The product (273 parts by weight) was then treated in the oven for an additional 0.5 hour to complete the drying. The dehydrated xanthate obtained in this way consisted of 259 parts by weight. It remained stable for four months when stored at 25° C.

*Example II*

Shallow trays loaded with a total of 1679 parts by weight crude cellulose xanthate were placed in an oven and treated with a current of air heated to approximately 65° C. The oven differed from that used in Example I in that no recirculation of air occurred. Fresh air was continuously drawn into the oven by means of a fan, was heated by means of steam coils, was passed over the xanthate, and was then allowed to escape. After one hour's drying, the partially dehydrated product, comprising 1044 parts by weight, was removed from the oven and ground. The dehydration was then completed by returning the xanthate to the oven for 1.5 hours. The resultant product, consisting of 919 parts by weight, was still in good condition, after seven months' aging at 25° C. Judging from the behavior of solutions prepared from this product, it was of unusually good stability.

*Example III*

A mixture of 1085 parts by weight of cellulose xanthate and approximately 3000 parts by weight of alcohol was vigorously stirred for 15 minutes. The mixture was then centrifuged to remove the major portion of the alcohol extract. The xanthate, consisting of 820 parts by weight, was next ground and placed in an air circulating oven maintained at 35-45° C. After five hours' treatment, dehydration was substantially complete. The product, which now consisted of 580 parts by weight, was kept for a day in a container containing phosphorus pentoxide and was then placed in a tightly sealed container. The stability of the product was somewhere between two and four months.

*Example IV*

Four hundred grams of crude cellulose xanthate was washed twice with 800 parts by weight of acetone by vigorously stirring the xanthate and solvent together for ten minutes each time and filtering. This extraction process removed the major portion of the water from the xanthate but, unlike the alcohol extraction method, did not materially affect the composition of the remaining constituents. The residue was then ground and placed in an air circulating oven at 35° C. until the remainder of the acetone and water was removed. The product had a stability of at least two months.

The dehydration of cellulose xanthate by means of a current of dry air is not limited to the specific conditions given in the examples. In place of tray ovens, air circulating rotary ovens may be used. A tower arrangement in which dry air is passed through columns packed with xanthate also gives satisfactory results. Still another method consists in dropping xanthate into a tower in which there is an upward current of dry air. This counter-current arrangement is similar to that used in producing powdered milk. As already pointed out, inert gases, e. g. nitrogen, may be used in place of air. It is also within the scope of the present invention to add a small amount of carbon disulfide to the gas used for the dehydration, care of course being taken to avoid the hazards attendant upon a mixture of carbon disulfide and air.

As indicated in the examples, the dehydration process is applicable to purified xanthate as well as to crude xanthate. In other words, the xanthate may be precipitated by an acetic acid-salt solution, or it may be washed with alcohol or acetone prior to the air-drying operation. It is also possible to couple the present method of dehydration with methods previously described. Thus the xanthate may be partially dehydrated by treatment with air, then submitted to vacuum distillation until the remainder of the water has been removed.

In the examples, the xanthate is ground after it has been partially dehydrated. The grinding operation may be carried out before or after the drying step or it may be omitted entirely. The xanthate may also be ground in a mill through which a current of air is circulating. This causes both drying and grinding and prevents the xanthate from becoming overheated.

The method for the stabilization of cellulose xanthate described herein is applicable to cellulose xanthate prepared from all forms of cellulose including cotton linters, sulfite pulp, etc. Although the most stable products are obtained from xanthates prepared with a carbon disulfide: cellulose ratio greater than 40:100, the method is also applicable in improving the stability of xanthates prepared with lower percentages of carbon disulfide. The dehydration method of stabilization is applicable to xanthates of other polymeric carbohydrates such as starch xanthate, inulin xanthate, glycogen xanthate, and the like.

Stabilized cellulose xanthate is applicable to all of the processes for which ordinary xanthate or viscose is used. The stability of ordinary cellulose xanthate limits the utilization of this material to localities adjacent to the points of manufacture. Cellulose xanthate stabilized by the methods described herein can be shipped to distant points and stored for a considerable length of time without suffering harmful decomposition, whereas ordinary cellulose xanthate must be used soon after it is prepared. Probably the most important advantage of the present invention over earlier methods of stabilization is that it requires less time and therefore ties up less equipment, and in addition, the method is simple to the extreme. A further advantage of the process of the present invention in its application to crude xanthate, is that substantially no alkali is removed from the xanthate and the total alkali:cellulose ratio is not altered. This means that no more alkali is required in preparing viscose from the stabilized product than is needed in the case of ordinary xanthate. This advantage is likewise true for xanthate dehydrated after acetone extraction.

As many apparently widely different embodiments of this invention may be made without departing from the spirit and scope thereof, it is to be understood that I do not limit myself to the specific embodiment thereof except as defined in the appended claims.

I claim:

1. A process for stabilizing cellulose xanthate, comprising washing with acetone and dehydrating the same by exposure in a solid moist condition at approximately 40–100° C. at a high exposed surface:mass ratio to a current of an inert gas capable of taking up moisture.

2. Process of stabilizing cellulose xanthate which comprises dehydrating cellulose xanthate, prepared with an excess of carbon bisulfide and containing water incident to the formation of the xanthate, by exposure in a solid moist condition to a current of warm air at a temperature of 40–100° C. and at a relatively high exposed surface:mass ratio.

3. Process of preparing dry, stable cellulose xanthate from moist, crude cellulose xanthate which comprises spreading the moist, crude xanthate containing water incident to the formation of the xanthate in a thin layer and exposing the same to a current of warm air until substantially dry.

4. Process of preparing dry, stable cellulose xanthate from moist, crude cellulose xanthate which comprises spreading the moist, crude xanthate containing water incident to the formation of the xanthate in a thin layer and exposing the same to a current of air at 40–100° C. until substantially dry.

5. Process of preparing dry, stable cellulose xanthate which comprises xanthating alkali cellulose by treating the same with at least 40 parts carbon bisulfide per 100 parts cellulose, spreading the moist, crude cellulose xanthate containing water incident to the formation of the xanthate in a thin layer, and exposing to a current of air warmed at 40–100° C. until the xanthate is substantially dry.

HARRY B. DYKSTRA.